J. B. JOHNSTON.
PIVOT MOUNTING.
APPLICATION FILED APR. 26, 1921.

1,409,007.

Patented Mar. 7, 1922.

Inventor,
J. B. Johnston,
By B. Foster,
Attorney.

UNITED STATES PATENT OFFICE.

JAMES B. JOHNSTON, OF PAOLA, KANSAS, ASSIGNOR OF ONE-SIXTH TO FRANK M. SHERIDAN AND ONE-SIXTH TO BERNARD L. SHERIDAN, BOTH OF PAOLA, KANSAS.

PIVOT MOUNTING.

1,409,007.  Specification of Letters Patent.  Patented Mar. 7, 1922.

Application filed April 26, 1921. Serial No. 464,727.

*To all whom it may concern:*

Be it known that I, JAMES B. JOHNSTON, a citizen of the United States, residing at Paola, in the county of Miami and State of Kansas, have invented certain new and useful Improvements in Pivot Mountings, of which the following is a specification.

The present invention relates to pivot mountings, and is particularly designed for the stub axle spindles of the steering gear of automobiles, though obviously it is applicable to other uses.

The object is to provide a mounting in which the bearing elements can be readily adjusted to take up wear, and at the same time provide a relatively great amount of strength and rigidity between the parts.

In the accompanying drawings:—

Figure 1:
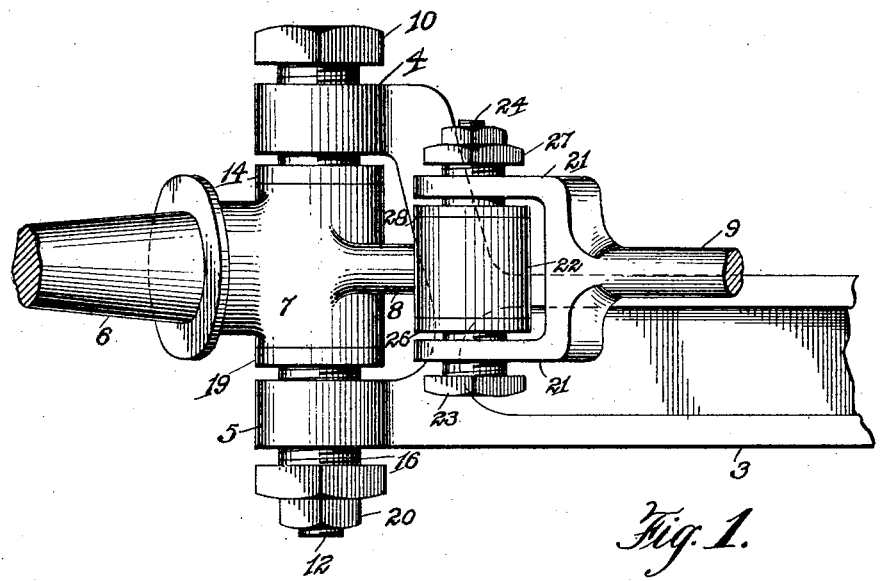
Figure 1 is a view in elevation of the improvement.
Figure 2:
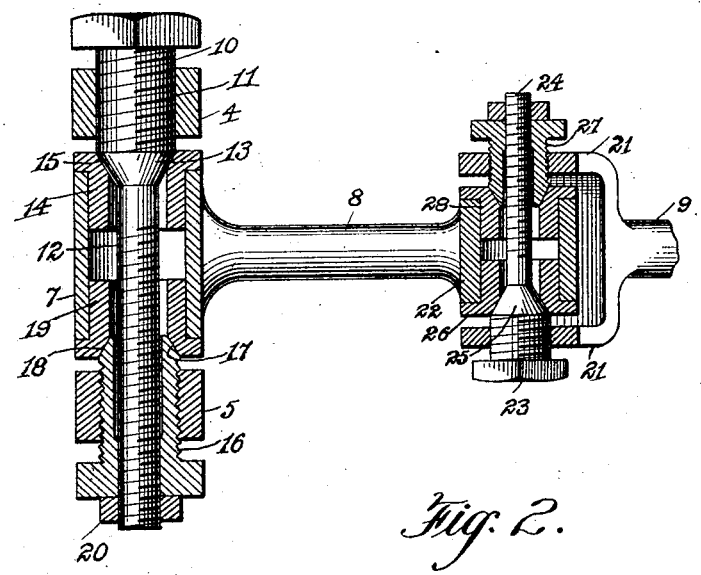
Figure 2 is a longitudinal sectional view therethrough.

A portion of an automobile axle is shown at 3, and is provided with an upper ear 4 and a lower ear 5. An axle spindle is shown at 6, and as usual extends from a sleeve or collar 7 located between the ears 4 and 5. This collar has a crank arm 8 to which the steering rod 9 is pivotally connected.

A bolt 10 is adjustably threaded as shown at 11, in the upper ear 4, and has a reduced threaded stem 12 passing through the sleeve 7 and through the ear 5. At the juncture of the stem 12 with the body of the bolt, a cone bearing element 13 is formed that cooperates with a bearing element 14 fitted in the upper end of the sleeve 7. In other words this element 14 is provided with a cone socket portion 15 to receive the cone 13.

Adjustably threaded through the lower ear 5 is a plug element 16 that is also threaded on the stem 12, and this plug element terminates in a cone 17, fitting into a cone socket 18 formed in a lower bearing element 19 mounted in the lower end of the sleeve 7. A jamb nut 20 is preferably threaded on the lower projecting end of the bolt stem 12 and bears against the outer end of the plug 16.

With this construction, it will be evident that either of the cones may be adjusted in order to take up any wear in the bearing, or both may be raised and lowered to vary the position of the sleeve 7 vertically with respect to the axle. Any adjustment obviously can be easily attained, since the parts are readily accessible. The stem 12 moreover extends entirely through the bearing structure to strengthen the entire mounting by acting as a tie between the ears 4 and 5 and also between the two cones.

The connection between the crank arm 8 and the rod 9 may be correspondingly constructed. Thus the rod 9 may have upper and lower ears 21, and the crank provided with a terminal collar 22 interposed between the ears. A bolt 23 is threaded into the lower ear 21, and has a stem 24 passing through the collar 22 and through the upper ear 21. The cone of the bolt is shown at 25, and has a bearing against a bushing 26 in the lower end of the collar 22. A plug 27, threaded through the upper ear 21, has a bearing in a similar bushing 28 in the upper end of the collar.

From the foregoing, it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:

1. A pivotal mounting comprising a member having spaced relatively fixed ears, a member between the ears, a pivot bolt passing through both ears and the interposed member and having an interlocked engagement with one of the ears, a bearing element for one side of the interposed member, and a second bearing element for the opposite side of the interposed member interlocked with the bolt and the other ear and relatively adjustable with respect to both to permit adjustment of the bearing and when adjusted said structure acting as a reinforcement between the ears.

2. A pivotal mounting comprising a member having spaced relatively fixed ears, a member between the ears, a pivot bolt adjustably threaded through one ear and passing through the interposed member and the other ear, said bolt having a bearing element for one side of the interposed member, and a second bearing element for the opposite side of the interposed member interlocked with the bolt and the other ear and relatively adjustable with respect to both to permit adjustment of the bearing and when adjusted said structure acting as a reenforcement between the ears.

3. A pivotal mounting comprising a member having spaced ears, a second member having a sleeve between the ears provided with terminal cone sockets, a bolt threaded in one ear and having an intergral reduced threaded stem passing through the sleeve and into the other ear, the juncture of said bolt and reduced stem having a cone operating in the adjacent cone socket, and a plug threaded in said other ear and on the stem and having a cone operating in the adjacent cone socket of the sleeve.

In testimony whereof I affix my signature in the presence of two witnesses.

JAMES B. JOHNSTON.

Witnesses:
  BERNARD L. SHERIDAN,
  MRS. E. C. McKEEVER.